(12) United States Patent
Yang

(10) Patent No.: US 8,368,917 B2
(45) Date of Patent: Feb. 5, 2013

(54) PRINTING SYSTEM AND METHOD THEREOF

(75) Inventor: Seung-sik Yang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1150 days.

(21) Appl. No.: 11/487,376

(22) Filed: Jul. 17, 2006

(65) Prior Publication Data

US 2007/0064253 A1 Mar. 22, 2007

(30) Foreign Application Priority Data

Sep. 16, 2005 (KR) ........................ 10-2005-0086780

(51) Int. Cl.
*G06F 3/12* (2006.01)
*G06K 15/00* (2006.01)
*G06K 15/02* (2006.01)

(52) U.S. Cl. ...... 358/1.15; 358/1.1; 358/1.11; 358/1.13; 358/1.16; 358/1.17

(58) Field of Classification Search .......... 358/1.1–1.18, 358/1.9; 709/208
See application file for complete search history.

(56) References Cited

U.S. PATENT DOCUMENTS

| 5,822,510 A * | 10/1998 | LeClair et al. ............... 358/1.16 |
| 6,166,824 A * | 12/2000 | Kadota ......................... 358/1.15 |
| 6,798,530 B1 * | 9/2004 | Buckley et al. ............... 358/1.13 |
| 6,876,466 B1 * | 4/2005 | Morikawa et al. ........... 358/1.17 |
| 6,963,412 B1 * | 11/2005 | Toda ............................. 358/1.13 |
| 7,193,735 B2 * | 3/2007 | Asahi ........................... 358/1.13 |
| 7,298,521 B2 * | 11/2007 | Hayashi ....................... 358/1.18 |
| 7,464,335 B2 * | 12/2008 | Nakagiri et al. .............. 715/700 |
| 7,525,682 B2 * | 4/2009 | Mori et al. ................... 358/1.18 |
| 7,538,898 B2 * | 5/2009 | Fukuda ........................ 358/1.14 |
| 7,557,950 B2 * | 7/2009 | Hatta et al. .................... 358/1.9 |
| 7,612,906 B2 * | 11/2009 | Toda ............................. 358/1.16 |
| 7,636,757 B2 * | 12/2009 | Kemp et al. .................. 709/208 |
| 2001/0026371 A1 * | 10/2001 | Nozaki ........................... 358/1.1 |
| 2002/0015170 A1 * | 2/2002 | Kamei et al. ................. 358/1.13 |
| 2003/0007169 A1 * | 1/2003 | Tanaka et al. ................ 358/1.15 |
| 2003/0067625 A1 * | 4/2003 | Kim .............................. 358/1.15 |
| 2003/0123076 A1 * | 7/2003 | Park ............................. 358/1.13 |
| 2003/0151652 A1 * | 8/2003 | Shima et al. .................. 347/102 |
| 2003/0231345 A1 * | 12/2003 | Azami .......................... 358/1.18 |
| 2004/0008374 A1 * | 1/2004 | Choi ............................. 358/1.16 |
| 2004/0145776 A1 * | 7/2004 | Azami .......................... 358/1.15 |

(Continued)

FOREIGN PATENT DOCUMENTS

| JP | 09-218809 | 8/1997 |
| JP | 2002-132835 | 5/2002 |

(Continued)

OTHER PUBLICATIONS

Office Action issued in Korean Patent Application No. 2005-86780 on Nov. 20, 2006.

*Primary Examiner* — Satwant Singh
(74) *Attorney, Agent, or Firm* — Staas & Halsey LLP

(57) ABSTRACT

A printing system, including an image data generator to generate at least a part of printing data as image data; a storage to store the image data and the printing data; a display part to display the image data stored in the storage; and a controller to make desired printing data selected by displaying the image data stored in the storage on the display part according to an input command.

21 Claims, 4 Drawing Sheets

U.S. PATENT DOCUMENTS

| | | | |
|---|---|---|---|
| 2005/0152004 A1* | 7/2005 | Park | 358/1.18 |
| 2005/0195453 A1* | 9/2005 | Asano | 358/523 |
| 2006/0114486 A1* | 6/2006 | Park | 358/1.13 |
| 2006/0285141 A1* | 12/2006 | Kim et al. | 358/1.13 |

FOREIGN PATENT DOCUMENTS

| | | |
|---|---|---|
| JP | 2002-358174 | 12/2002 |
| KR | 2004-6063 | 1/2004 |

* cited by examiner

FIG. 3

| FILE NAME | USER ID | |
|---|---|---|
| EAC | Cjh | |
| ABO | Kek | |
| CBF | Cks | |
| WDA | Lhj | |

PRINTING SYSTEM AND METHOD THEREOF

CROSS-REFERENCE TO RELATED APPLICATION

This application claims benefit under 35 U.S.C. §119(a) of Korean Patent Application No. 2005-86780, filed Sep. 16, 2005 in the Korean Intellectual Property Office, the disclosure of which are incorporated herein by reference.

BACKGROUND OF THE INVENTION

1. Field of the Invention

Aspects of the present invention relate to a printing system and a method thereof. More particularly, aspects of the present invention relate to a printing system storing a part of printing data as an image to easily distinguish printing data upon printing the printing data stored in a printer and a method thereof.

2. Description of the Related Art

When a conventional printer prints printing data provided from a user terminal device, the printer temporarily stores the data during printing and automatically deletes the data after printing. Meanwhile, in general, as various documents are printed in the office or home, there are standardized documents used by plural users or documents frequently used by each user. In this case, when each user wants to print such documents, the user generates a printing command through a print window and the user terminal device drives a printer driver to process and transmit the data to the printer. Accordingly, as numbers of such documents increase, the traffic between the user terminal device and the printer driver increases and users may have to generate the printing commands of the documents one by one again. To solve this and/or other problems, a printer with a storing function is provided so that printing data of the frequently used documents are stored in the printer to be used upon reprinting.

Processing printing data in the printer with the storing function is performed as follows. If the printing data are transmitted from the user terminal device to the printer, the printing data are stored in a temporary storage of a memory of the printer. In this state, a printing part is driven to print the printing data on the paper. Conventionally, after printing is finished, the printing data are automatically deleted from the temporary storage. However, the improved printer determines whether the storing function is selected by a user before or after printing. If the storing function is selected, the printing data are stored in a permanent storage such as a hard disk drive (HDD).

The printing data stored in the permanent storage of the printer may be searched using the file name, user ID or the like in the printer, and the user may select the desired printing data among the searched printing data and print the data directly from the printer.

When a printer has the storing function installed therein, a user can immediately print printing data stored in the printer. However, as printing data stored in the printer increases, searching for the desired printing data gets more difficult. That is, conventionally, when printing data stored in the printer are searched, only the file name of the printing data or user ID is displayed. So, when the user does not know exactly the file name of the printing data, it is not easy to search for the desired printing data. In addition, when the user knows the file name, the user has to confirm the entire file name of the printing data.

SUMMARY OF THE INVENTION

An aspect of the present invention is to solve the above and/or other problems and disadvantages and to provide at least the advantages described below. Accordingly, an aspect of the present invention provides a printing system storing a part of printing data as an image to easily distinguish printing data upon printing the printing data stored in a printer and a method thereof.

In order to achieve the above-described aspects of the present invention, there is provided a printing system comprising: an image data generator to generate at least a part of printing data as image data; a storage to store the image data and the printing data; a display part to display the image data stored in the storage; and a controller to make desired printing data selected by displaying the image data stored in the storage on the display part according to an input command.

The above and/or other aspects may be accomplished by a printing method of a printing system, comprising generating at least a part of printing data written by a user as image data, storing the image data and the printing data in a printer, externally displaying the image data stored in the printer, and printing printing data corresponding to selected image data of the displayed image data.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a view of a display part showing the state of which printing data are searched.

DETAILED DESCRIPTION OF THE EMBODIMENTS

Figure 1:
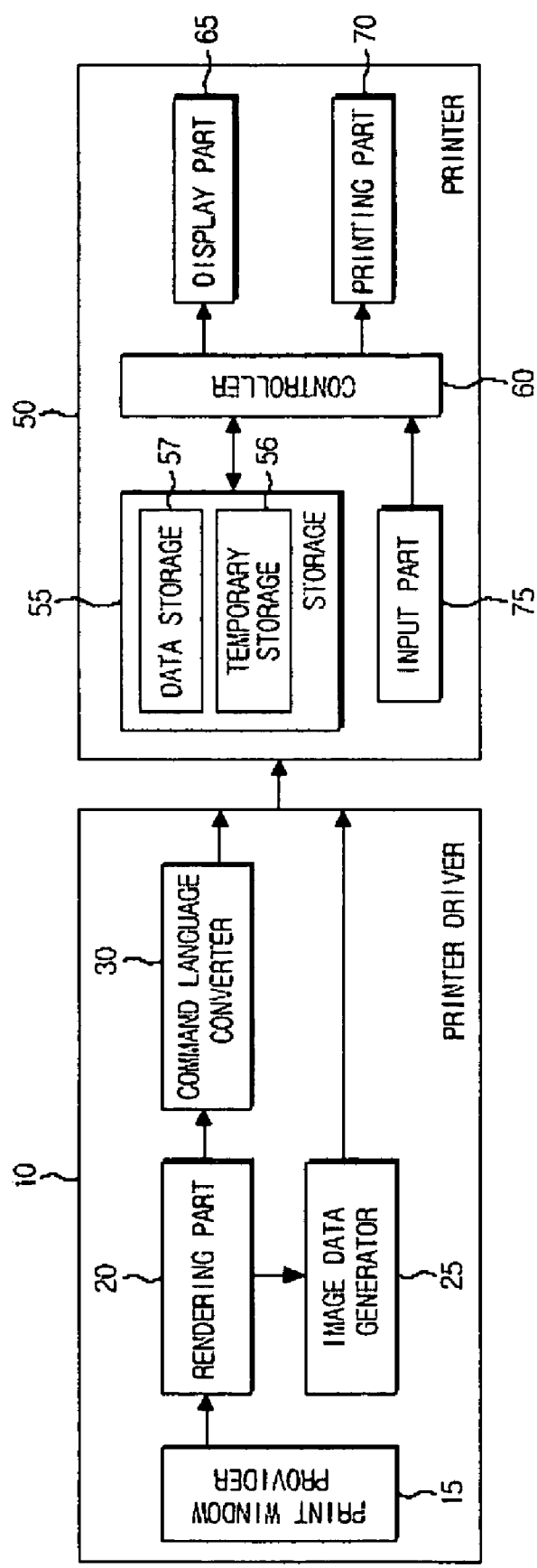
FIG. 1 is a block diagram showing the construction of a printing system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram showing the construction of a printing system according to an embodiment of the present invention. The printing system includes a printer driver 10 installed in a user terminal device and a printer 50 printing printing data processed in the printer driver 10. The printer driver 10 generates a part of the printing data to be stored in the printer 50 as image data and provides the image data with the printing data to the printer 50. To this end, the printer driver 10 includes a print window provider 15, a rendering part 20, an image data generator 25 and a command language converter 30.

Figure 2:
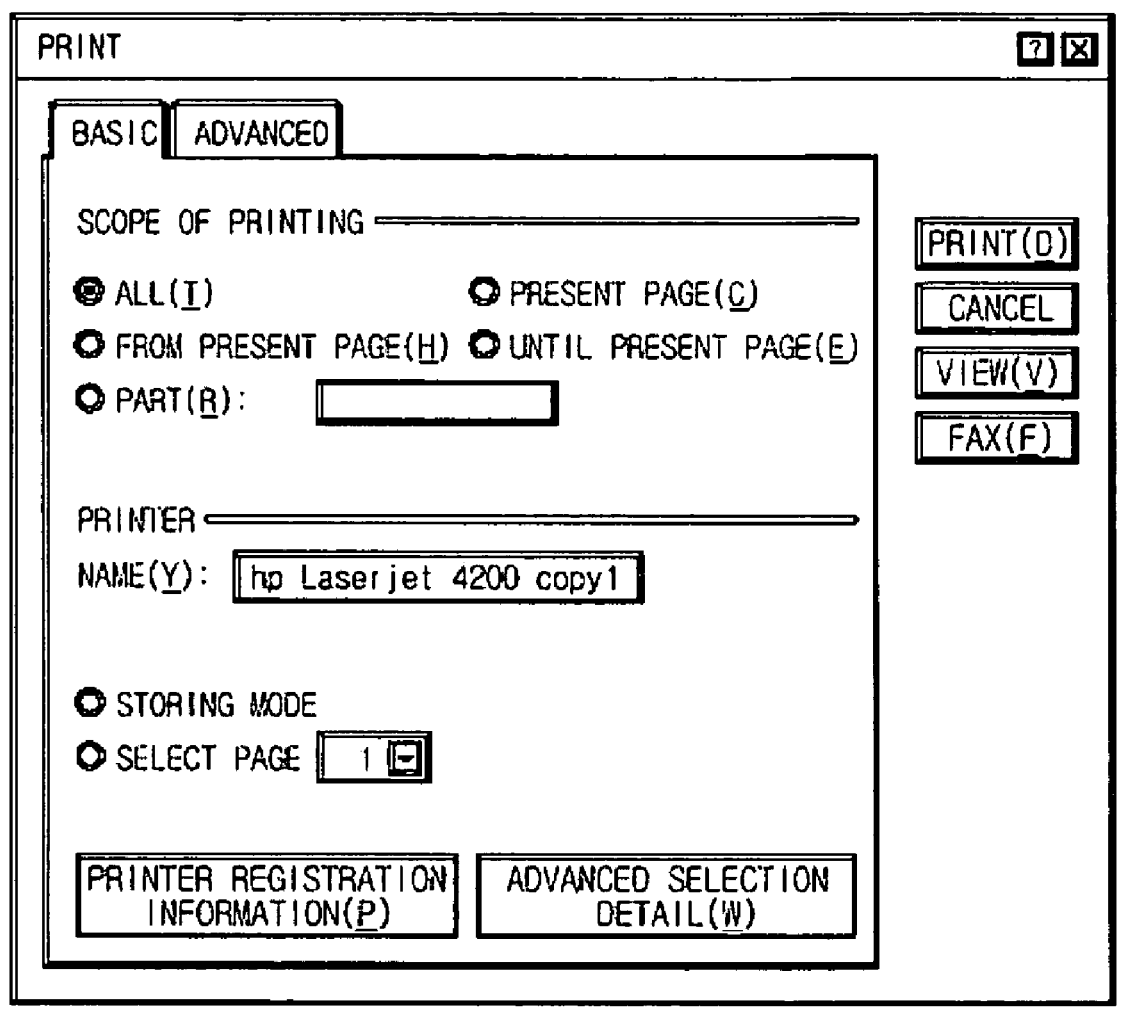
FIG. 2 is a view of a print window formed by a printer driver according to an embodiment of the present invention.

If a user writes a document using an application program and selects a print menu of the application program to print the document, the print window provider 15 provides a print window to select the print option as shown in FIG. 2. The print window comprises a list box to allow for a selection of a printer, a menu to allow for a selection of the scope of printing as shown in a general print window, and also a check box of the 'storing mode' to select whether to store the printing data in the printer 50. A 'select page' column, which is activated if the check box of the 'storing mode' is selected, is provided under the check box of the 'storing mode'.

The storing mode is a mode selected when the user wants to store the printing data in the printer 50. If the storing mode is selected, when the printing data are stored in the printer 50, a part of the printing data, that is, a particular page, is generated as image data and stored with the printing data in the printer 50. When the user searches for the printing data in the printer 50, the image data are displayed through a display part as a preview. The user may generate image data of the desired page by selecting the 'select page' column under the check box of 'storing mode'. Meanwhile, if the user does not select a page in the 'select page' column, a certain page, for example, the first page, is automatically selected and image data of the first page are generated.

The rendering part 20 receives the printing data written through the application program and renders the page selected by the user through the print window or the preset page, which is a particular page to be generated as image data for the preview, to convert the printing data into bitmap data.

The image data generator 25 works only when the user selects a storing mode. The image data generator 25 converts the printing data of the particular page that is bit-mapped in the rendering part 20 into image data. The image data can have various image file formats such as Joint Photographic Expert Group (JPEG), Tagged Image File (TIF) and Portable Document Format (PDF).

The command language converter 30 converts the printing data into a printer control language which the printer is able to interpret. However, the image data generated in the image data generator 25 are not converted into the command language. The printer control language is a command language which the user terminal device transmits to the printer 50 to instruct the printer 50 how to construct the document to print. The command language manages the font size, graphic, compression of data to be transmitted to the printer 50, and color. The languages mainly used as the printer control language are PostScript and the printer control language (PCL).

The printing data converted into the printer control language in the command language converter 30 and the image data generated in the image data generator 25 are then transmitted to the printer 50

Meanwhile, the printer 50, which receives the printing data and the image data and prints the printing data, comprises a storage 55, an input part 75, a display part 65, a printing part 70 and a controller 60. The storage 55 includes a temporary storage 56 to temporarily store the printing data during printing and a data storage 57 to store the printing data and the image data which are selected in the storing mode. The input part 75 to receive a command from a user includes a power button, a search button to search for the printing data stored in the data storage 57, a direction button to select the searched printing data, and a print button to command printing operations. The display part 65 comprises a Liquid Crystal Display (LCD) panel of a certain size and may be large enough to show a list of the searched printing data and the corresponding image data. Additionally, the display part 65 may comprise a touch screen so that the number of buttons in the input part 75 may be reduced.

Figure 3:
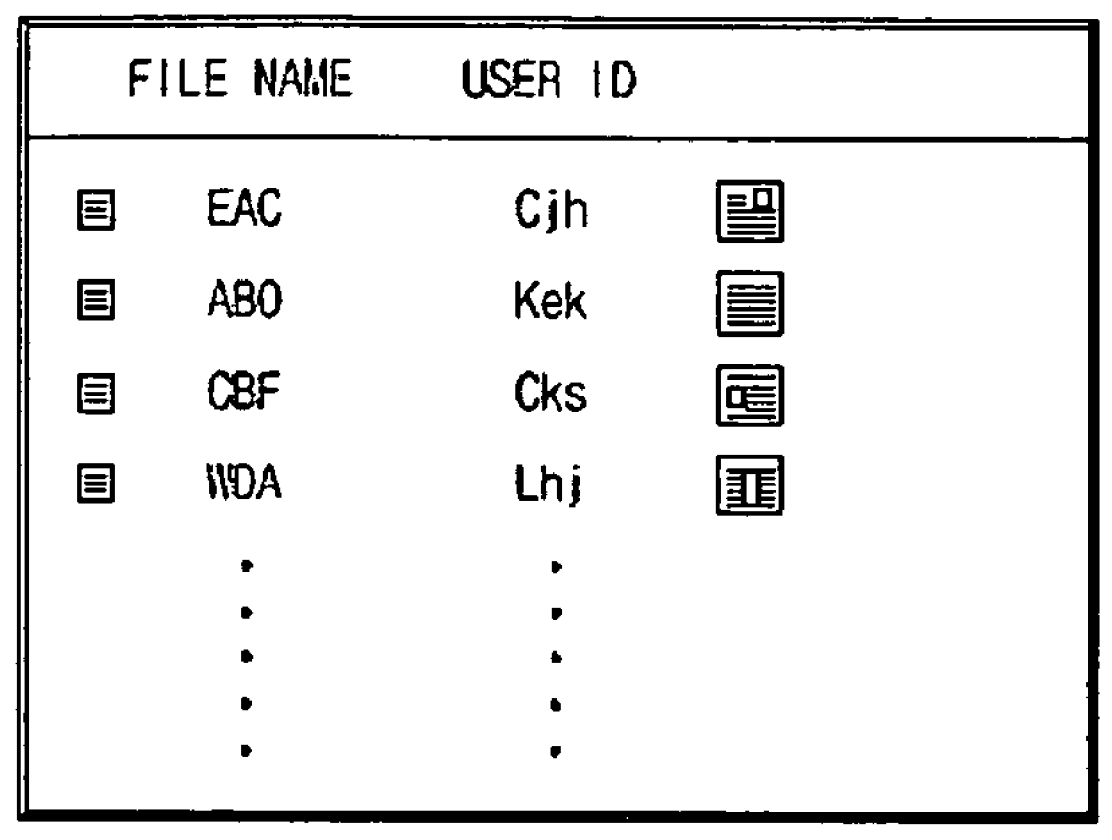

If the user selects the search button, the display part 65 shows the list of the printing data and the corresponding image data stored in the data storage 57. As shown in FIG. 3, the display part 65 displays the file names of the printing data, user IDs and image data. In the meantime, when the search button is selected, in an embodiment of the invention, only the image data may be shown on the display part 65 as a thumbnail image. Subsequently, if the user selects one of the printing data, the corresponding image data are enlarged on the display part 65.

The printing part 70 includes various components used to print the printing data on the paper, or another recording medium, and operates according to the control of the controller 60.

Receiving the printing data and image data with the storing mode selected in the user terminal device, the controller 60 stores the printing data and image data in the data storage 57. If the user selects the search button, the controller 60 displays a list of the printing data and the corresponding image data, which are stored in the data storage 57, on the display part 65. If a user selects a certain printing data, the corresponding image data are enlarged. Next, if the user presses the print button, the printing part 70 operates to print the printing data.

Figure 4:
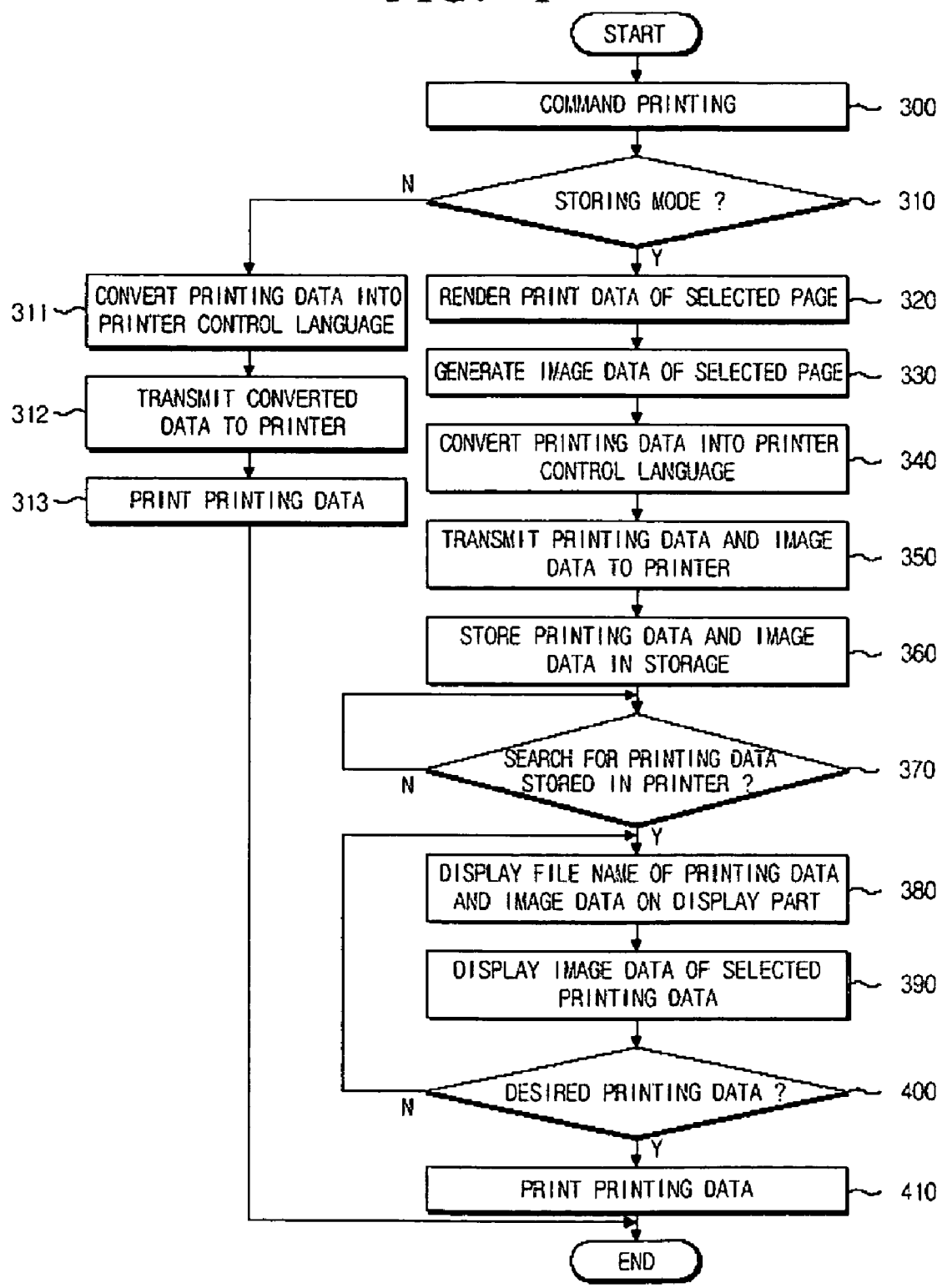
FIG. 4 is a flow chart showing the process of processing printing data by a printing system according to an embodiment of the present invention.

Referring to FIG. 4, the process of printing using the storing mode in the printing system having the above construction is as follows.

If a user writes a document using an application program and selects to print the document (300), the print window provider 15 of the printer driver 10 provides the print window. The user may print the desired document in the storing mode through the print window (310). If the user selects the storing mode and a page to convert into image data, the rendering part 20 of the printer driver 10 converts printing data of the page into bitmap data (320). The image data generator 25 then generates image data corresponding to the page (330). When the user does not select a page to convert into image data, the image data generator 25 generates image data of the first page, as an example.

The command language converter 30 converts the printing data into a printer control language (340), and the printing data with the image data generated in the image data generator 25 are transmitted to the printer 50 (350). At that moment, a command language representing that the image data are not printing data but preview data is transmitted together. The controller 60 of the printer 50 stores the printing data and the image data in the data storage 57 (360).

When the printing data and the image data are stored in the data storage 57, if the user wants to print the printing data later, the user searches for the printing data stored in the printer (370). Subsequently, the controller 60 displays a list of printing data stored in the data storage 57 as shown in FIG. 3 and the corresponding printing data on the display part 65 (380).

If the user selects the desired printing data using the direction button, the controller 60 enlarges the image data of the printing data (390). When the user determines that the printing data are the specific printing data the user wants (400), the user selects the print button and the controller 60 drives the printing part 70 to print the printing data (410). Of course, in the state of which the printing data are selected, if the print button is selected, the printing data may be constructed to be directly printed without enlarging the selected image data.

Meanwhile, if the user does not select the storing mode, the printing data are converted into a printer control language in the command language converter 30 (311) and are transmitted to the printer 50 (312). In the printer 50, the printing data are stored in the temporary storage 56, printed (313), and deleted from the temporary storage 56 after printing.

As is described above, in the printing system, the desired page of printing data is converted into image data and stored with the printing data in the printer 50. When a user prints desired data of the printing data stored in the printer 50, the user may relatively easily find the desired printing data by the image data displayed on the display part 65. Accordingly, the user stores the desired printing data in the printer 50 so that the traffic between the user terminal device and the printer 50 may decrease, and the desired printing data may be found relatively easily so that less time is required to prepare for printing and user convenience is provided.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A printing system, comprising:
    a user terminal including an image data generator to generate at least a part of printing data as image data; and
    a printer to receive the generated image data together with the printing data and to print the printing data,
    wherein the user terminal comprising:
    a print window provider to provide a print window to allow for a selection of a print option;
    a rendering part to receive the printing data and to render a page of the printing data in association with the selected print option; and
    an image data generator to convert the printing data of the page into image data when the selected print option is a storing mode for the printer to store the image data together with the printing data and to transmit the image data to the printer.

2. The system of claim 1, wherein the printer comprises a storage to store the image data and the printing data;
    a display part to display the image data stored in the storage; and
    a controller to make desired printing data selected by displaying the image data stored in the storage on the display part according to a command input at the printer.

3. The system of claim 2, further comprising a printing part to print the printing data, wherein the controller controls the printing part to print the printing data stored in the printing part according to a selection of a user.

4. A printing method of a printing system, comprising:
    generating at a user terminal at least a part of printing data written by a user as image data;
    receiving at a printer the generated image data together with the printing data; and
    printing the printing data,
    wherein the generating at a user terminal at least a part of printing data comprise;
    providing at a print window provider a print window to allow for a selection of a print option;
    receiving at a rendering part the printing data;
    rendering a page of the printing data in association with the selected print option;
    converting at an image data generator the printing data of the page into image data when the selected print option is a storing mode for the printer to store the image data together with the printing data; and
    transmitting the image data to the printer.

5. The method according to claim 4, further comprising;
    storing the generated image data together with the printing data in a printer;
    externally displaying the image data stored in the printer at the printer; and
    printing print data corresponding to the displayed image data.

6. A printer driver of a printing system including a user terminal and a printer in which printing data are written in an application program, the printer driver in the user terminal comprising:
    a print window provider to provide a print window to allow for a selection of a print option;
    a rendering part to receive the printing data and to render a page of the printing data in association with the selected print option; and
    an image data generator to convert the printing data of the page into image data when the selected print option is a storing mode for the printer to store the image data together with the printing data and to transmit the image data to the printer.

7. The printer driver according to claim 6, wherein the print window comprises:
    a list box to allow for a selection of a printer;
    a menu to allow for a selection of a scope of printing; and
    a check box of the storing mode to select to store the printing data in the printer.

8. The printer driver according to claim 7, wherein the print window further comprises a select page column, which is activated if the check box of the storing mode is selected.

9. The printer driver according to claim 8, wherein, if the storing mode is selected, when the printing data are stored in the printer, a part of the printing data is generated as image data and stored with the printing data in the printer, and wherein, when a user searches for the printing data, the image data are displayed as a preview at the printer.

10. The printer driver according to claim 6, wherein the image data comprise file formats including at least one of Joint Photographic Expert Group (JPEG), Tagged Image File (TIF) and Portable Document Format (PDF).

11. The printer driver according to claim 6, further comprising a command language converter to convert the printing data into a printer control language which the printer is able to interpret.

12. The printer driver according to claim 11, wherein the image data generated in the image data generator are not converted into the command language.

13. The printer driver according to claim 11, wherein the printer control language is a command language which the user terminal device transmits to the printer to instruct the printer how to construct a document comprising the printing data.

14. The printer driver according to claim 13, wherein the command language manages the font size, graphic, and compression of the printing data.

15. The printer driver according to claim 6, wherein the printer comprises a storage including a temporary storage to temporarily store the printing data during printing and a data storage to store the printing data and the image data in the storing mode.

16. The printer driver according to claim 15, wherein the printer further comprises an input part to receive inputs from a user, the input part including a power button, a search button to search for the printing data stored in the data storage, a direction button to select the searched printing data, and a print button to command printing operations.

17. The printer driver according to claim 16, wherein the printer further comprises a display part including a Liquid Crystal Display (LCD) panel, wherein, if the user selects the search button, the display part shows the list of the printing data and the corresponding image data stored in the data storage.

18. A method of operating a printing system in which a command generated at a user terminal to print a document is received by a printer in a storing mode, the method comprising:

storing printable data of the document together with image data, which was associated by the user terminal with the print data, in the printer, comprising rendering the print data of a selected page of the document;

searching for the printable data; and if printable data is found, determining whether the printable data corresponds to the printable data of the document;

if the printable data of the document is found, printing the printable data.

19. The method according to claim 18, wherein the storing comprises:

generating the image data of the selected page;

converting the print data into printable data; and transmitting the printable data and the image data from the user terminal to the printer.

20. The method according to claim 18, wherein the determining comprises displaying a file name of the print data and the image data associated with the print data.

21. The method according to claim 18, further wherein, if the printer is not in the storing mode, the method further comprises:

converting the print data of the document into printable data;

transmitting the printable data from the user terminal to the printer; and printing the printable data.

\* \* \* \* \*

UNITED STATES PATENT AND TRADEMARK OFFICE
CERTIFICATE OF CORRECTION

PATENT NO. : 8,368,917 B2  
APPLICATION NO. : 11/487376  
DATED : February 5, 2013  
INVENTOR(S) : Seung-sik Yang Page 1 of 1

It is certified that error appears in the above-identified patent and that said Letters Patent is hereby corrected as shown below:

In the Claims

Column 6, Line 1, In Claim 5, delete "comprising;" and insert -- comprising: --, therefor.

Signed and Sealed this  
Eleventh Day of June, 2013

Teresa Stanek Rea  
*Acting Director of the United States Patent and Trademark Office*